United States Patent [19]

Hagiwara et al.

[11] Patent Number: 4,519,813
[45] Date of Patent: May 28, 1985

[54] PROCESS FOR EXTRACTION OF HIGHLY PURIFIED OXYGEN

[75] Inventors: Zenzi Hagiwara; Tatuo Yamamoto, both of Kusatsu; Hiroshi Kurozumi, Sakai, all of Japan

[73] Assignee: Osaka Oxygen Industries Ltd., Osaka, Japan

[21] Appl. No.: 106,474

[22] Filed: Dec. 26, 1979

Related U.S. Application Data

[63] Continuation of Ser. No. 884,651, Oct. 25, 1977, abandoned.

[30] Foreign Application Priority Data

Feb. 10, 1977 [JP] Japan .................................. 52-13672

[51] Int. Cl.³ .......................................... B01D 53/04
[52] U.S. Cl. ........................................... 55/26; 55/58; 55/62; 55/68; 55/75
[58] Field of Search .................. 55/25, 26, 33, 58, 62, 55/68, 75

[56] References Cited

U.S. PATENT DOCUMENTS

| | | | |
|---|---|---|---|
| 3,338,030 | 8/1967 | Feldbauer, Jr. ................ | 55/62 X |
| 3,473,296 | 10/1969 | Tamura .......................... | 55/75 X |
| 3,564,816 | 2/1971 | Batta ............................. | 55/26 |
| 3,636,679 | 1/1972 | Batta ............................. | 55/26 |
| 3,738,087 | 6/1973 | McCombs ...................... | 55/58 |
| 3,923,477 | 12/1975 | Armond et al. ............... | 55/25 |
| 3,957,463 | 5/1976 | Drissel et al. ................. | 55/25 |
| 3,973,931 | 8/1976 | Collins .......................... | 55/62 X |
| 4,013,429 | 3/1977 | Sircar et al. ................... | 55/33 |

FOREIGN PATENT DOCUMENTS

| | | |
|---|---|---|
| 3514529 | 11/1957 | Japan . |
| 398204 | 5/1961 | Japan . |
| 4226164 | 12/1964 | Japan . |
| 4226165 | 12/1964 | Japan . |
| 43283 | 1/1965 | Japan . |
| 4520082 | 1/1967 | Japan . |
| 47-50996 | 12/1972 | Japan . |
| 48-83078 | 11/1973 | Japan . |
| 49-106488 | 10/1974 | Japan . |

Primary Examiner—Robert Spitzer
Attorney, Agent, or Firm—Browdy and Neimark

[57] ABSTRACT

A process for separating oxygen more than 90% pure from a raw material gas, for example air, containing oxygen and nitrogen as main components, includes at least two adsorption zones, each having an inlet and a discharging end, and containing therein a bed of an adsorbing agent having sieving action which is capable of selectively adsorbing nitrogen from said raw material gas.

8 Claims, 1 Drawing Figure

PROCESS FOR EXTRACTION OF HIGHLY PURIFIED OXYGEN

This is a continuation of application Ser. No. 884,651, filed Oct. 25, 1977, now abandoned.

BACKGROUND OF THE INVENTION

This invention relates to an improved process for extracting oxygen from a gas through pressure-swing adsorption (PSA) process using an adsorbent having sieving action, and particularly a process for separating oxygen from the gas in which the yield of oxygen is great and in which the purity of oxgyen obtained is high.

In the prior art, oxygen was produced from air through low-temperature processing. However, though low-temperature processing is effective for producing highly pure oxygen, low-temperature processing is costly because it requires very low-temperature and super-pressurized air.

The highly pure oxygen that is obtained through low-temperature processing is not required for all uses. For example, such highly pure oxygen is unnecessary for BOD removal in waste water treatment, in the oxidizing process of acetic acid, ethylene oxide and phthalic anhydride, for fermentation industry, for oxygen bleaching and oxidation of black liquor in the paper making industry, for air conditioning, for oxygen-blown furnaces, and for an ozonizer. Even oxygen less than 95% pure is sufficient for these purposes. Therefore, for use in these fields, oxygen produced through an adsorption process is satisfactory and more economical. The cost of equipment for the adsorption process is much less, because it does not require very high pressure operation. Also, adsorbents having long life and being capable of being easily regenerated have become available.

We have found that in many of these fields, the use of oxygen produced through an adsorption process is profitable.

It has been known that molecular sieves and zeolites have greater ability to adsorb nitrogen than oxygen. The known PSA process utilizes such property. The PSA process comprises adsorption, depressurization, desorption and pressurization as basic steps. In the PSA process a raw gas containing nitrogen and oxygen as main components, for example air, is passed through an adsorbing bed to selectively adsorb nitrogen and a slight amount of carbon dioxide and moisture, thereby obtaining a gas having a higher oxygen concentration than that of the raw gas. However, with the PSA process, it is difficult to obtain oxygen more than 90% pure from air in a high yield.

SUMMARY OF THE INVENTION

An object of this invention is to provide a process for continuously obtaining oxygen of more than 90% purity in a high yield.

This invention relates to a process for separating oxygen more than 90% pure from a raw material gas containing oxygen and nitrogen as main components, which process comprises providing at least two adsorption zones, each having an inlet end and a discharge end and containing therein a bed of an adsorbing agent or a bed of a mixture of adsorbing agents, the agent having sieving action which is capable of selectively adsorbing nitrogen from said raw material gas, characterized by (i) an adsorption step of contacting said raw material gas with said bed by flowing said raw material gas through the adsorption zone, in which the regenerating step was previously completed, to adsorb most of the nitrogen and part of the oxygen in the bed, thereby discharging oxygen more than 90% pure from said zone discharge end, (ii) connecting the adsorption zone, in which the adsorption step was previously completed, to the adsorption zone, in which a pressurizing step by product oxygen gas as mentioned below was previously completed, to carry out pressure equalization between said two zones, whereby the oxygen-rich gas is cocurrently discharged from the former zone (absorption) to depressurize the former zone, (iii) countercurrently depressurizing to one atmosphere pressure the adsorption zone in which the step of discharging gas through the pressure equalization was previously completed, (iv) countercurrently evacuating to less than 200 torr the adsorption zone in which the depressurizing step was previously completed, (v) pressurizing the adsorption zone, in which the evacuating step was previously completed, by countercurrently introducing into the zone part of product oxygen gas in the direction counter to the direction of the stream of raw material gas while closing one end thereof, (vi) pressurizing the zone, in which the pressurizing step by the product oxygen gas was previously completed, by cocurrently introducing into said zone the gas discharged in step (ii), and (vii) pressurizing the adsorption zone, in which the pressurizing step through the pressure equalization was previously completed, by introducing a raw material gas into the zone in the same direction as the direction of the stream of raw material gas in adsorption step (i) while closing one end of the zone, periodically switching the flow between said adsorption zones so that the adsorption step takes place in the zone in which the regenerating step was previously completed, the step of discharging gas through the pressure equalization takes place in the zone in which the adsorption step was previously completed, the depressurizing step takes place in the zone in which the step of discharging gas was previously completed, the evacuating step takes place in the zone in which the depressurizing step was previously completed, the pressurizing step by product oxygen gas takes place in the zone in which the evacuating step was previously completed, the pressurizing step through the pressure equalization takes place in the zone in which the pressurizing step by product oxygen gas was previously completed, and the pressurizing step by a raw material gas takes place in the zone in which the pressurizing step through the pressure equalization was previously completed.

BRIEF DESCRIPTION OF THE DRAWING

The FIGURE shows a flow chart in case of carrying out the present invention by using four adsorption zones or columns.

Adsorption zones or columns are shown at A-1, A-2, A-3 and A-4. Compression apparatus is shown at C. Buffer tanks are shown at BT-1 and BT-2. A vacuum pump is shown at V. Charge tanks are shown at CT-1 and CT-2. The charge tanks CT-1 and CT-2 store part of the product oxygen gas discharged from buffer tank BT-2 via line 8 and valve NV-3, and feed it into each of the adsorption zones. The oxygen gas is introduced from the charge tank to the adsorption zone, thereby pressurizing the zone. A raw material gas is compressed in compression apparatus C and is fed into the bottom of each adsorption zone through buffer tank BT-1 and line 3. The resulting product oxygen gas is discharged from the top of each adsorption zone and is transported through line 4, buffer tank BT-2 and line 5. Product oxygen gas for pressurization is fed into each adsorption zone through line 9 from each of the charge tanks. The gas removed from each zone in the depressurizing step is discharged to atmosphere through line 10. In the evacuating step, the gas removed from each zone is discharged through line 6. Valves are shown at V-1 to V-32. Valves are opened and closed automatically or by hand.

EMBODIMENTS OF THE INVENTION

Figure 1:
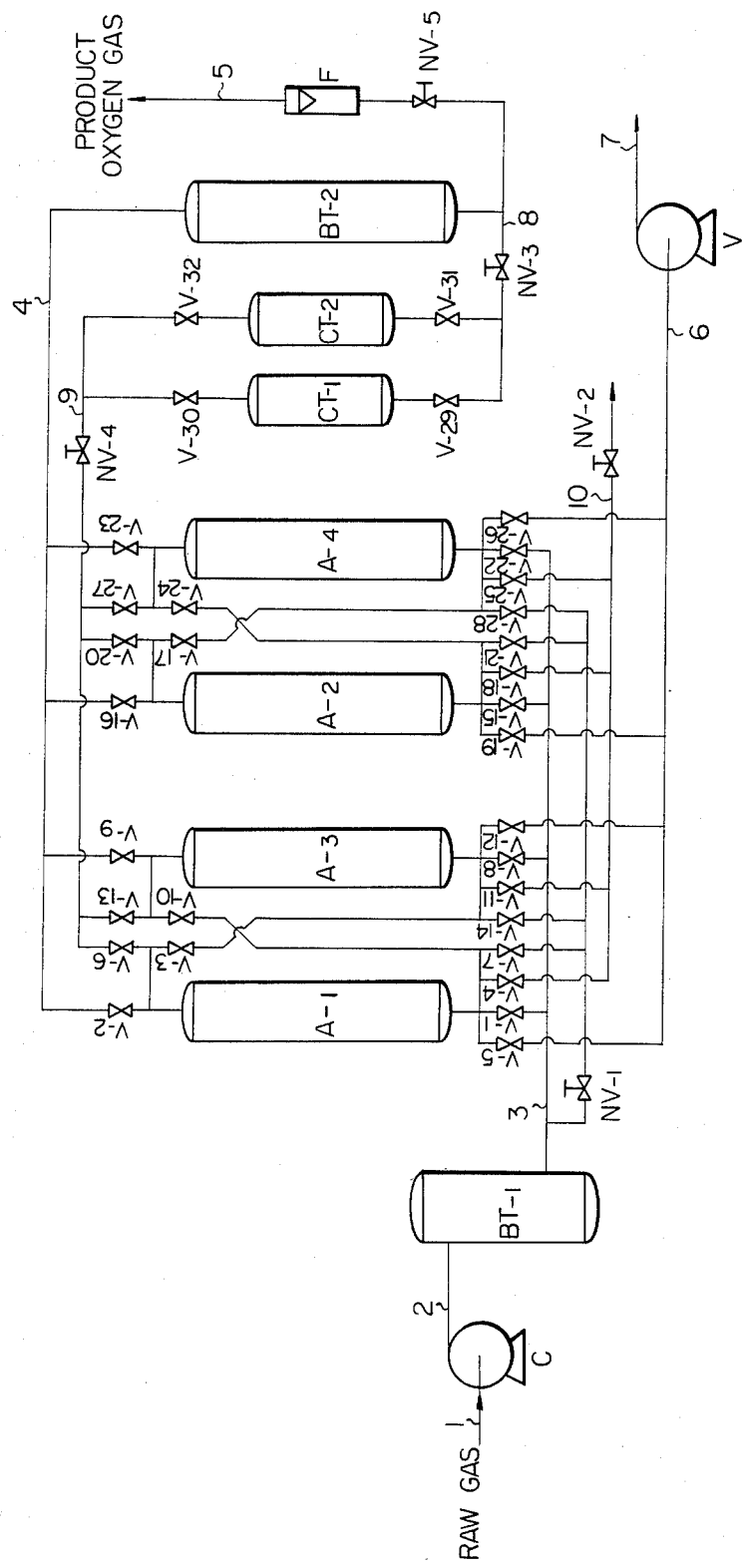

The term "countercurrently depressurizing" means depressurizing in the direction countercurrent to the stream of raw material gas.

The term "cocurrently introducing" means introduction in the same direction as the direction of the stream of raw material gas.

The term "cocurrently discharging" means discharging in the same direction as the direction of the stream of raw material gas.

The term "countercurrently evacuating" means evacuating in the direction countercurrent to the stream of raw material gas.

The term "raw material gas" means a gas having an oxygen content of 90% or less which has not flowed through any adsorption zone.

In the adsorption step, the pressure in the adsorption zone may be at about 1 to about 5 kg/cm² Gauge, preferably 3 to 4 kg/cm² Gauge. In this step, the raw material gas, for example, air is flowed through the adsorption zone, in which the regenerating step was previously completed, whereby most of the nitrogen and part of other impurities are removed to obtain oxygen gas at least 90% pure.

In the pressure equalization, the adsorption zone in which the adsorption step was previously completed is connected to the adsorption zone in which the pressurizing step by product oxygen gas was previously completed. The pressure in the adsorption zone in which the adsorption step was previously completed is higher than the pressure in the adsorption zone in which the pressurizing step by product oxygen gas was previously completed. Therefore, when the two zones are connected to each other, the oxygen-rich gas discharged from the former is introduced into the latter. The oxygen-rich gas is discharged from the former in the same direction as the direction of the stream of raw material gas and then is charged into the latter in the same direction as the direction of the stream of raw material gas. In general, when the pressure in the adsorption step is 3 kg/cm² G, the pressure in the two zones after pressure equalization is completed is from about 0.4 to 0.5 kg/cm² G. After the adsorption step is completed, oxygen gas less than 90% pure but having a higher oxygen concentration than that of the raw material gas is present in the adsorption zone. In the pressure equalization, the oxygen gas is used for pressurization of another zone.

The depressurizing step takes place in the direction counter to the direction of the stream of the raw material gas. This step takes place by opening the adsorption zone to atompshere, and the pressure in the adsorption is automatically lowered to 1 atmosphere. The gas discharged in the depressuring step is not used because of the low concentration of the oxygen, but since the discharged gas is in a very dry state, it is usable for drying the raw gas.

The evacuating step takes place by using a vacuum pump to pull the gas remaining in the adsorption zone in the direction counter to the direction of the stream of the raw material gas. In this step, the adsorption zone may be evacuated to less than 200 torr or mmHg, preferably 50 to 180 torr. When the degree of vacuum is more than 200 torr, oxygen more than 90% pure can not be obtained, because the regeneration of the adsorption bed is not sufficient. In this case, the yield of oxygen is also low. When the degree of vacuum is less than 30 torr, a large amount of energy is necessary for maintaining the adsorption zone at such degree of vacuum. This is not economical. In general, when an adsorption zone is evacuated, the temperature in the zone lowers, whereby the desorption property of the adsorbing agent becomes poor. In the present invention, though the adsorption zone is evacuated to a degree of vacuum in the above range, the desorption property of the adsorbing agent does not drop so low that the purification of oxygen is suppressed.

The pressurization by product oxygen gas of the adsorption step takes place in the adsorption zone in which the evacuating step was previously completed. The pressurizing step takes place by introducing part of the product oxygen gas into the zone in the direction counter to the direction of the stream of raw material gas while closing one end of the zone. At least 20%, preferably from 35 to 60%, of the product oxygen gas may be employed for the pressurizing step. When the pressure in the adsorption zone is from 2 to 3 kg/cm² Gauge, the degree of vacuum in the evacuating step is 50 to 180 torr and 35 to 60% of the product oxygen gas is employed for pressurization, and oxygen gas more than 92% pure can be obtained. The reason why the adsorption is pressurized by introducing part of the product oxygen gas into the zone in the direction counter to the direction of the stream of the raw gas is that the portion in which impurities are adsorbed is moved near the inlet end of the zone.

The adsorption zone in which the pressurization by product oxygen gas was previously completed is further pressurized by the pressure equalization. The gas discharged from said adsorption zone is introduced into another adsorption zone in the direction counter to the direction of the stream of raw material gas to keep the adsorbing portion of the impurities near the inlet end of the zone, thereby enhancing the adsorbing efficiency of the raw material gas. The pressurization through the pressure equalization contributes to high purification of raw material gas and production of oxygen in a high yield.

The pressurization by the raw material gas takes place in the adsorption zone in which the pressurizing step through the pressure equalization was previously completed by introducing a raw material gas into the zone in the same direction as the direction of the stream of raw material gas in the adsorption step while closing one end of the zone. This step increases the pressure in the adsorption zone to that in the adsorption step.

It is critical that the depressurizing step, the evacuating step and the pressurizing by product oxygen gas take place in the direction counter to the direction of the stream of the raw material gas and that the step of discharging the oxygen-rich gas in the pressure equalization, the step of charging the gas in the pressure equalization and the pressurizing step by raw material gas take place in the same direction as the direction of the stream of the raw material gas. Therefore, since in the adsorption zone, before the adsorption step takes place, the portion near the discharge end of the zone holds more oxygen than the portion near the inlet end and the portion near the inlet end of the zone holds -continued

| | |
|---|---|
| equalization Pressurization by raw material gas | 2 minutes |

TABLE 1

Process timing sequence minutes: 0 — 3 — 6 — 9 — 12

| | | | | | | |
|---|---|---|---|---|---|---|
| A-1 | Adsorption | Discharge* | D** | Evacuation | Pressurization by product O$_2$ | Charge*** | Pressurization by raw material gas |

| | | | | | | |
|---|---|---|---|---|---|---|
| A-2 | Discharge | D | Evacuation | Pressurization by product O$_2$ | Charge | Pressurization by raw material gas | Adsorption |

| | | | | | | |
|---|---|---|---|---|---|---|
| A-3 | Evacuation | Pressurization by product O$_2$ | Charge | Pressurization by raw material gas | Adsorption | Discharge | D | Evacuation |

| | | | | | | |
|---|---|---|---|---|---|---|
| A-4 | Charge | Pressurization by raw material gas | Adsorption | Discharge | D | Evacuation | Pressurization by product O$_2$ |

*Discharge* discharge of gas in pressure equalization
D** Depressurization
Charge** Charge of gas or pressurization in pressure equalization more impurities than the portion near the discharge end, this contributes to the production of oxygen having high purity.

The adsorbent employed in the present invention may include molecular sieves and zeolites. Of molecular sieves, molecular sieves 4A–10A and molecular sieve 13X are preferred. Of zeolites, zeolites 4A–8A and zeolite X and mordenite are preferred. Molecular sieves 4A, 5A and 13X and mordenite, zeolites 4A and 5A are most preferred. A mixture of the adsorbents can also be used. Other adsorbents having sieving action which are capable of selectively adsorbing nitrogen from the raw material gas can also be used. The adsorbent agent may be used in the form of molded pellets. Good results are obtained in case of using pellets of about ⅛ inch diameter.

The raw material gas containing oxygen and nitrogen as main components from which oxygen is extracted may include air and waste gas obtained from a variety of works.

In practicing the present process, the number of the adsorption zones or columns is not critical. The use of four adsorption zones or columns is preferred. Using four adsorption columns, oxygen of higher purity can be economically obtained in a high yield.

Table 1 shows the staggered sequence of operation of the four adsorption zones or columns in detail. In order to give a total cycle time of 12 minutes, it is preferred that the time allotted for each step be as follows.

| | |
|---|---|
| Adsorption | 3 minutes |
| Discharge of gas in pressure equalization | 1 minute |
| Depressurization | 30 seconds |
| Evacuation | 3 minutes |
| Pressurization by product oxygen gas | one and half minutes |
| Charge of gas in pressure | 1 minute |

The present invention is further explained by but is not limited to the flow sheet as shown in FIG. 1. The raw material gas containing oxygen is fed into compressing means C through line 1, and the gas is compressed therein. The compression of the gas condenses steam to generate water, whereby the condensed water is removed from the gas phase. The compressed gas is fed into buffer tank (BT-1) through line 2, and is fed into the bottom of each adsorption zone (A-1, A-2, A-3 and A-4) from the buffer tank. The adsorption zones are filled with adsorbent composed of zeolite. The zones are connected to vacuum pump V through line 6. The exhausted gas is discharged into atmosphere through line 7. The product oxygen gas discharged from the adsorption zones is transported through line 4, buffer tank (BT-2) and line 5. F is a measuring meter coupled to the output of buffer tank BT-2 via valve NV-5. Charge tanks (CT-1 and CT-2) are connected to BT-2 via line 8 and valve NV-3 and store part of the product oxygen gas. The stored oxygen gas is used for pressurizing the adsorption zones. When the present process is operated on an industrial scale according to the time sequence as shown in Table 1, the charge tanks work according to the time sequence as shown in Table 2. The use of the charge tanks is not critical. Part of the product oxygen gas is stored in the charge tanks. So, when charge tanks are used, pressurization by product oxygen gas at a constant pressure can be effected smoothly.

Time allotted for each step is as follows:

| | |
|---|---|
| Holding | one and half minutes |
| Discharging | one and half minutes |
| Charging | 3 minutes |

This invention is not limited by such time sequence of the charge tanks.

TABLE 2

Time sequence of charge tanks

TABLE 2-continued

| | 0 | | | 3 | | | 6 | | | 9 | | | 12 |
|---|---|---|---|---|---|---|---|---|---|---|---|---|---|
| CT-1 | Holding | Discharging | Charging | Holding | Discharging | Charging |
| CT-2 | Charging | Holding | Discharging | Charging | Holding | Discharging |

The present invention is further illustrated, but in no way limited, by the following working of the apparatus.

0 to 1 minute:

Valve V-7 is closed and valves V-1 and V-2 are opened. The raw material gas is charged into adsorption zone A-1 through valve V-1. Nitrogen gas and impurities are adsorbed in the adsorbing agent, and the resulting oxygen gas more than 90% pure is discharged from adsorption zone A-1 through valve V-2 and line 4 and is introduced into buffer tank BT-2, and is transported through line 5. Needle valve NV-4 is adjusted so that oxygen is discharged from zone A-1 at a predetermined speed. Valves V-15 and V-16 are closed and valve V-17 is opened, whereby adsorption zone A-2 is connected to adsorption zone A-4. The gas containing oxygen highly pure from the top of adsorption zone A-2 is introduced into adsorption zone A-4 in the same direction as the direction of the stream of the raw material gas. The pressure in adsorption zone A-2 becomes equal to that in adsorption zone A-4. Valve V-12 is opened. The evacuating step takes place in adsorption zone A-3 successively. Valve V-29 is opened. Part of the product oxygen gas is charged from buffer tank BT-2 to charge tank CT-2. Needle valve NV-4 is adjusted so that pressurization of each zone is completed in one and half minutes. Needle valve NV-3, placed between the charge tanks and buffer tank BT-2, is adjusted so that introduction of product oxygen gas from buffer tank BT-2 to charge tanks is completed in 3 minutes.

1 minute to one and half minutes:

During this period, the adsorption step and evacuation step are successively carried out in adsorption zones A-1 and A-3, respectively. The depressurizing step is carried out in adsorption zone A-2. Valve V-17 is opened and Valve V-18 is closed. Adsorption zone A-2 is depressurized to one atmospheric pressure in the direction counter to the direction of the stream of raw gas. Needle valve NV-2, positioned at line 10, is adjusted so that the drepressurizing step is completed in 30 seconds. Valve V-28 is opened. The pressurizing step by the raw material gas takes place in adsorption zone A-4, whereby the pressure in adsorption A-4 increases to the pressure in the adsorption step. Needle valve NV-1 is adjusted so that the pressurizing step by the raw material gas is completed in 2 minutes.

During the period from 0 to one and half minutes, charge tank CT-1 holds product oxygen gas for pressurization. Charge tank CT-2 charged product oxygen gas.

One and half to 3 minutes:

During this period, the adsorption step and the pressurizing step by raw material gas are successively carried out in adsorptions A-1 and A-4, respectively. The evacuating step is carried out in adsorption zone A-2. Valve V-18 is closed and valve V-19 is opened. Adsorption A-2 is evacuated from 1 atmosphere to a determined degree of vacuum. Valve V-12 is closed and valve V-13 is opened. Part of product oxygen gas from charge tank CT-1 is introduced into adsorption zone A-3 in the direction counter to the direction of the stream of raw material gas to pressurize the zone.

During the period from one and half to 3 minutes, charge tank CT-1 holds product oxygen gas for pressurization. Charge tank CT-2 charges product oxygen gas.

By periodically switching the flows to and from each of said adsorption zones each bed of an adsorbent(s) is caused to cyclically go through each step in the above described process.

According to the present invention, oxygen gas more than 90% pure can be continuously obtained in a high yield.

When the oxygen-separating apparatus is provided with charge tanks CT-1 and CT-2 to keep the product oxygen for pressurization for a predetermined period, the change in pressure can be made small. Therefore, pressurization of each adsorption zone by product oxygen can be carried out smoothly.

Table 3 shows the staggered sequence of operation of the two adsorption zones in detail. In order to give a total cycle time of 10 minutes it is preferred that the time allotted for each step be as follows.

Adsorption step (I) 2 minutes
Discharging step of gas in the pressure equalization (II) 1 minute
Depressurizing step (III) 1 minute
Evacuating step (IV) 2 minutes
Pressurizing by product oxygen gas (V) 1 minute
Charging step of gas in the pressure equalization (VI) 1 minute
Pressurizing step by raw gas (VII) 2 minutes

TABLE 3

| | Time sequence 0 5 10 |
|---|---|
| A-1 | I \| II \| III \| IV \| V \| VI \| VII |
| A-2 | IV \| V \| VI \| VII \| I \| II \| III \| IV |

Table 4 shows the staggered sequence of operation of the three adsorption zones in detail. In order to give a total cycle time of 15 minutes it is preferred that the time allotted for each step be as follows.

Adsorption step (I) 5 minutes
Discharging step of gas in the pressure equalization (II) 1 minute
Depressurizing step (III) 1 minute
Evacuating step (IV) 2 minutes
Pressurizing by product oxygen gas (V) 1 minute
Charging step of gas in the pressure equalization (VI) 1 minute
Pressurizing step by raw gas (VII) 3 minutes

TABLE 4

```
                Process timing sequence
Minute  0       3       6       9       12      15
        |_|_|_|_|_|_|_|_|_|_|_|_|_|_|_|_|

A-1         |       I        |II|III| IV |V|VI|  VII  |

A-2     |II|III| IV |V|VI|  VII  |         I         |

A-3     |V|VI|  VII  |         I         |II|III| IV |
```

When two or three adsorption zones or columns are used, two buffer tanks and two charge tanks can also be used.

The invention is further illustrated, but in no way limited by the following Examples.

EXAMPLES 1-7 AND COMPARATIVE EXAMPLES 1 AND 2

Dry air was employed as a raw material gas. Molecular sieve 5A (Examples 1-5) and mordenite type zeolite 501 from Osaka Oxygen Industries Ltd. sold under the name of Zeoharb (Examples 6 and 7) were employed as adsorbing agents. Adsorption columns made of iron which have an inside diameter of 57 mm were employed as adsorption zones. These adsorbing agents were employed in the form of pellets of ⅛ inch diameter. Molecular sieve 5A was employed in an amount of 5.74 kg and Zeoharb was employed in an amount of 5.5 kg. The oxygen-separating operation was carried out by using the apparatus as shown in FIG. 1 according to the above described process. The results are shown in Table 5.

Control test 1 was carried out as follows:

Four adsorption zones were employed. Zeoharb was employed. Air was contacted with a bed of Zeoharb by flowing air through the adsorption zone in which the regenerating step was previously completed, thereby obtaining product oxygen gas (hereinunder referred to as adsorption step I). Air was further flowed through the zone in which the adsorption step I was previously completed, thereby obtaining oxygen gas having a purity lower than that of the product oxygen gas (hereinunder referred to as adsorption step II). The zone in which adsorption step II was previously completed was countercurrently depressurized to one atmosphere pressure. The zone in which the depressurizing step was previously completed was evacuated to the degree of vacuum shown in Table 6. The zone in which the evacuating step was previously completed was pressurized by flowing the oxygen gas obtained in the adsorption step II through the zone in the same direction as the direction of the stream of air. In other words, pressurization by product oxygen gas was not effected in control test 1. The results are shown in Table 6.

Control test 2 was based on the invention of Japanese Patent Application 12288/1977 filed on Feb. 7, 1977 assigned to the assignee of this invention. The results are shown in Table 6.

The present invention is superior to control test 1 in respect of the purity of oxygen gas obtained, and is superior to control test 2 in respect of the yield of oxygen obtained.

TABLE 5

| Example No. | Temperature (°C.) | Pressure in adsorption column in the adsorption step (Kg/cm²G) | Degree of vacuum in evacuating step (torr) | Amount of O² contained in dry air employed as a raw material (liter) (STP) | Amount of product O² obtained (liter) (STP) |
|---|---|---|---|---|---|
| 1 | 21 | 3 | 100 | 21.57 | 30.03 |
| 2 | 21 | 3 | 100 | 21.18 | 25.10 |
| 3 | 19 | 3 | 100 | 20.50 | 28.91 |
| 4 | 20 | 2 | 100 | 18.20 | 27.84 |
| 5 | 23 | 2 | 100 | 16.36 | 23.60 |
| 6 | 17 | 3 | 100 | 19.1 | 21.4 |
| 7 | 23 | 2 | 80 | 17.1 | 20.1 |

| Example No. | Amount of Product O² employed in pressurization (STP) | Ratio of product O² employed in pressurization to product O² obtained | Amount of product O² discharged from the system (liter) (STP) | Purity of product O² (%) | Yield of product O² (%) | Yield of O² per unit of adsorbent (O² liter (STP)/ adsorbent Kg) |
|---|---|---|---|---|---|---|
| 1 | 16.05 | 53.4 | 13.98 | 93.6 | 64.8 | 2.44 |
| 2 | 10.83 | 43.1 | 14.27 | 94.2 | 67.4 | 2.49 |
| 3 | 16.16 | 55.9 | 12.75 | 94.0 | 62.2 | 2.22 |
| 4 | 16.10 | 57.8 | 11.74 | 93.1 | 64.5 | 2.05 |
| 5 | 13.61 | 57.7 | 9.91 | 92.7 | 61.1 | 1.74 |
| 6 | 8.2 | 38.3 | 13.2 | 91.8 | 69.1 | 2.40 |
| 7 | 8.0 | 39.8 | 12.1 | 92.2 | 70.8 | 2.20 |

TABLE 6

| | Temperature | Pressure in adsorption column in the | Degree of vacuum in | Amount of O² contained in dry air employed as | Amount of product O² |
|---|---|---|---|---|---|

TABLE 6-continued

| Control test | ature (°C.) | adsorption step (Kg/cm²G) | evacuating step (torr) | a raw material (liter) (STP) | obtained (a) (liter)(STP) |
|---|---|---|---|---|---|
| 1 | 12 | 3 | 50 | 35.2 | 18.4 |
| 2 | 14.5 | 3 | 100 | 30.5 | 27.7 |

| Control test | Amount of product O² employed in pressurization (STP) | Ratio of product O² employed in pressurization to product O² obtained | Amount of product O² discharged from the system (liter) (a–b) (STP) | Purity of oxygen obtained (%) | Yield of oxygen obtained (%) |
|---|---|---|---|---|---|
| 1 | none | — | 18.4 | 78.3 | 52.3 |
| 2 | 13.7 | 49.4 | 14.0 | 91.5 | 45.9 |

When the air used as raw material gas has a humidity of more than 90% RH it is necessary to dehumidify the air before introducing it into the oxygen-separating apparatus. In this case, the air is dehumidified by passing it through a drier filled with alumina gel or silica gel until the dew point of the air reaches as low as −60° to −70° C. Regeneration of the alumina gel or silica gel is effected by using the gas discharged in the depressurizing step, because the gas has a dew point of −60° to −75° C.

What is claimed is:

1. A process for separating oxygen of more than 90% purity from a raw material gas containing oxygen and nitrogen as main components, which comprises providing at least two adsorption zones, each of said at least two zones having an inlet end and a discharge end and containing therein a bed of at least one adsorbing agent, the at least one agent having sieving action which is capable of selectively adsorbing nitrogen from said raw material gas, characterized by the following in the following steps cyclical sequence:

(i) contacting said raw material gas with said bed by passing said raw material gas through the one of said adsorption zones, in which a regenerating step was previously completed, to adsorb most of the nitrogen and part of the oxygen in the bed, and to discharge oxygen of more than 90%, purity from said zone discharge end;

(ii) connecting said one adsorption zone, in which the adsorption step was previously completed, to the other of said adsorption zones, in which a pressurizing step by product oxygen gas as mentioned below was previously completed, to carry out pressure equalization between said two zones, whereby the oxygen-rich gas is cocurrently discharged from the said one adsorption zone to depressurize said one adsorption zone;

(iii) countercurrently depressurizing to one atmosphere pressure said one adsorption zone, in which the step of discharging gas through the pressure equalization was previously completed;

(iv) countercurrently evacuating to less than 200 torr said one adsorption zone;

(v) pressurizing said one adsorption zone by countercurrently introducing into said one adsorption zone part of the product oxygen gas in the direction counter to the direction of the stream of raw material gas while closing one end thereof;

(vi) pressurizing said one adsorption zone, in which the pressurizing step by the product oxygen gas was previously completed, by cocurrently introducing into said one adsorption zone the gas discharged from said other adsorption zone in step (ii) of the cycle of said other adsorption zone; and (vii) pressurizing said one adsorption zone, in which the pressurizing step through the pressure equalization was previously completed, by introducing a raw material gas into said one adsorption zone in the same direction as the direction of the stream of raw material gas in adsorption step (i) while closing one end of said one adsorption zone;

periodically switching the flow of gases between said adsorption zones so that the adsorption step takes place in the zone in which the regenerating step was previously completed, the step of discharging gas through the pressure equalization takes place in the zone in which the adsorption step was previously completed, the depressurizing step takes place in the zone in which the step of discharging gas was previously completed, the evacuating step takes place in the zone in which the depressurizing step was previously completed, the pressurizing step by product oxygen gas takes place in the zone in which the evacuating step was previously completed, the pressurizing step through the pressure equalization takes place in the zone in which the pressurizing step by product oxygen gas was previously completed, and the pressurizing step by a raw material gas takes place in the zone in which the pressurizing step through the pressure equalization was previously completed.

2. The process as defined in claim 1 wherein the pressure of the adsorption zone during the adsorption step is from about 1 Kg/cm² Gauge to about 5 Kg/cm² Gauge.

3. The process as defined in claim 1 wherein the degree of vacuum employed during the countercurrent evacuation is from about 50 torr to about 180 torr.

4. The process as defined in claim 1 wherein at least 20% of the product oxygen gas is used for pressurizing the adsorption zone.

5. The process as defined in claim 1 wherein the raw material gas is air.

6. The process as defined in claim 1 wherein the adsorbing agent is selected from the group consisting of zeolite 4A, zeolite 5A, zeolite X, molecular sieve 4A, molecular sieve 5A, molecular sieve 13X, mordenite and mixtures thereof.

7. The process as defined in claim 1 wherein the adsorption step and the regeneration step are carried out using four adsorption zones.

8. The process as defined in claim 1 wherein at least two charge tanks are employed, and product oxygen gas employed for pressurization is charged into one of the tanks, is held in the tank and then is discharged from the tank, and periodically switching the flow between said tanks so that the charging step takes place into the tank in which the discharging step was previously completed, the holding step takes place in the tank in which the charging step was previously completed and the discharging step takes place from the tank in which the holding step was previously completed.

* * * * *

UNITED STATES PATENT AND TRADEMARK OFFICE
CERTIFICATE OF CORRECTION

PATENT NO. : 4,519,813

DATED : May 28, 1985

INVENTOR(S) : HAGIWARA et al

It is certified that error appears in the above-identified patent and that said Letters Patent is hereby corrected as shown below:

Correct the information in [63] to read:

[63] Continuation of Ser. No. 844,651, Oct. 25, 1977, abandoned.

Signed and Sealed this

Twenty-first Day of January 1986

[SEAL]

Attest:

DONALD J. QUIGG

Attesting Officer

Commissioner of Patents and Trademarks